Jan. 2, 1940.   M. B. RATNER   2,185,568
METHOD OF SHAPING AIR FILLED RUBBER TO FORM
CUSHION GRIPS FOR STEERING WHEELS
Filed March 6, 1936   2 Sheets-Sheet 1
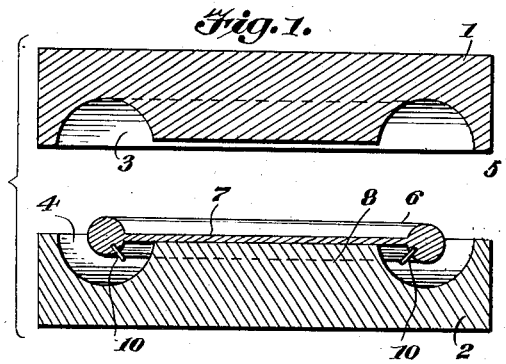
Fig. 1.
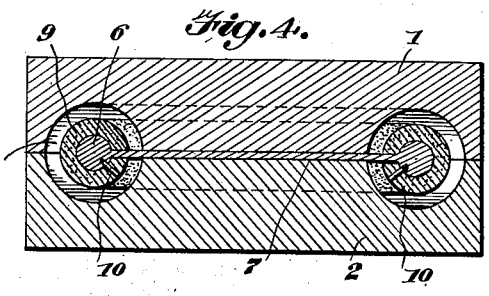
Fig. 4.
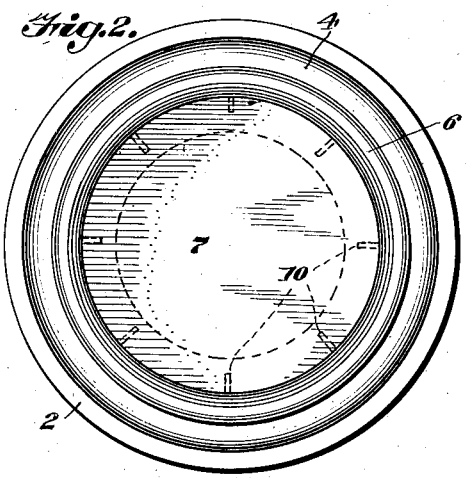
Fig. 2.
Fig. 3.
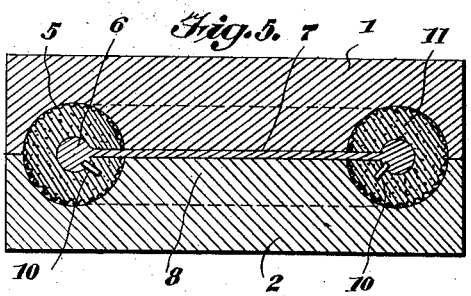
Fig. 5.
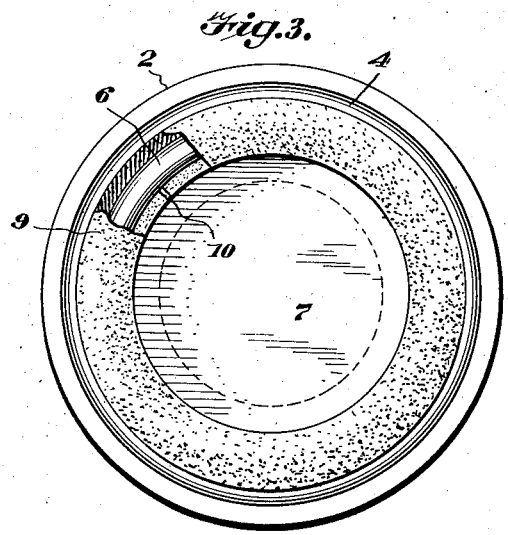
Fig. 6.
Fig. 14.
Inventor
MORRIS B. RATNER
By Irving A. McCathran
Attorney Jan. 2, 1940.   M. B. RATNER   2,185,568
METHOD OF SHAPING AIR FILLED RUBBER TO FORM
CUSHION GRIPS FOR STEERING WHEELS
Filed March 6, 1936   2 Sheets-Sheet 2
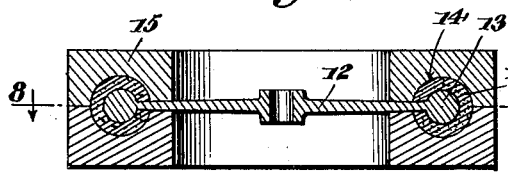
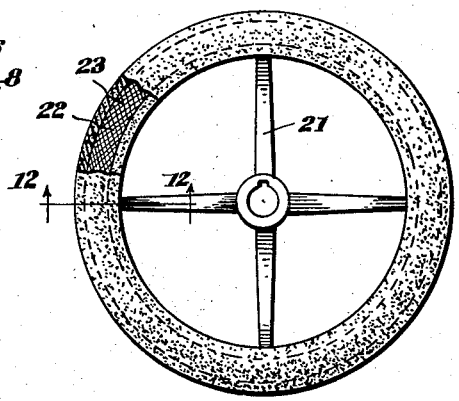
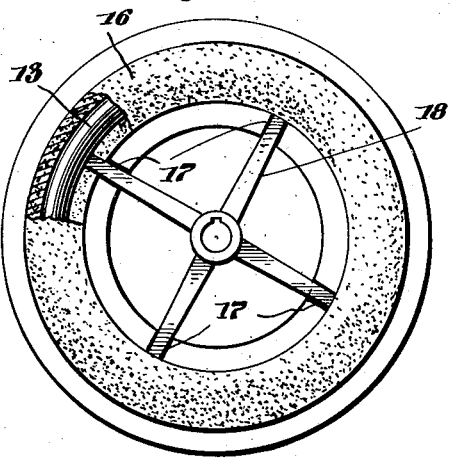
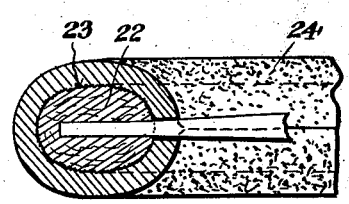
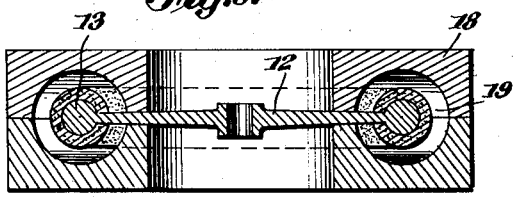
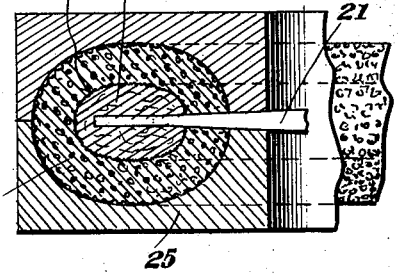
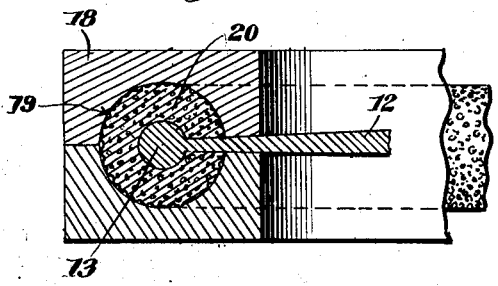
MORRIS B. RATNER Patented Jan. 2, 1940

2,185,568

UNITED STATES PATENT OFFICE 2,185,568

METHOD OF SHAPING AIR FILLED RUBBER TO FORM CUSHION GRIPS FOR STEERING WHEELS

Morris B. Ratner, Phoenix, Ariz.

Application March 6, 1936, Serial No. 67,544

1 Claim. (Cl. 18—59)

This invention relates to a method of shaping air filled rubber and forming tubular structures thereof capable of being used as a grip for a steering wheel of an automobile or as a grip for other articles for which it may be designed, the grip being so formed that when it is in use it will fit snugly about the article to which it is applied in close fitting engagement therewith.

At the present time grips for entirely enclosing the rim of a steering wheel or similar articles, are provided, but they are made of rubber such as is used for making tires and while they are effective to a certain extent in preventing slipping and making driving easier, they have not proved satisfactory. This is particularly true when used upon the steering wheel of an automobile being driven at high speed, the hands of the driver being practically in direct contact with the rim of the wheel except for the intervening layer of compact rubber, and vibrations will be transmitted to the hands and arms of the driver, and other portions of the body will be affected by the vibrations passing through his arms. The driver has a tendency to grip the wheel and this will cause muscle strain and nervous reactions resulting in the driver becoming very tired after continuing driving at high speed for a considerable length of time.

It has been found that ordinary rubber heats and sweats the hands and fades to the hand, due to the excessive perspiration caused, and it is not as durable as air filled or sponge rubber.

Attempts have been made to form grips of air filled rubber known as sponge rubber but have not been successful except when made of short flat strips intended to be secured about the wheel rim at points where the wheel is usually grasped and such grips have not been found satisfactory as a person's hands will move off the grips when making a turn and it is necessary to maintain the hands in substantially a stationary position upon the wheel rim. This is inconvenient and tiring to the driver.

Failure to make a success of forming a grip of sponge rubber which is adapted to entirely encircle and enclose the rim of a steering wheel has been due to the fact that the stock from which sponge rubber is formed has a consistency similar to dough and expands to form a porous mass when subjected to heat. It has previously been found impossible to accurately control expansive movements of the stock and cause it to properly fill a mold and conform to the contour of a core in the mold so that when removed from the mold the grip will be of the proper dimensions and configuration to fit snugly about a steering wheel rim.

Therefore, an object of this invention is the development of a method whereby a grip adapted to extend about and entirely enclose the rim of a steering wheel may be successively formed of sponge rubber and fit properly thereon when in use.

Another object of the invention is to provide a method of forming sponge rubber according to which the stock will be so disposed about a core in a mold that as it expands when subjected to heat it will remain in close contact with the core and the grip when made will fit snugly about the article to which it is applied.

Another object of the invention is to produce a process of shaping air filled rubber whereby the grip may be made as an article to be sold as an accessory or formed directly about the rim of a wheel, the wheel rim serving as a core during the making of the grip.

The invention is illustrated in the accompanying drawings wherein:

Figure 1 is a sectional view of a mold used when forming the improved grip for a steering wheel rim;

Figure 2 is a top plan view of the lower mold section with the core in place;

Figure 3 is a view similar to Figure 3 showing the rubber stock applied about the core;

Figure 4 is a view similar to Figure 1 but showing the mold closed and the rubber stock about the core;

Figure 5 is a view similar to Figure 4 showing the stock expanded about the core and filling the mold;

Figure 6 is an enlarged fragmentary sectional view of the mold;

Figure 7 is a sectional view of a modified method wherein a wheel of metal or hard rubber is placed in the mold as a core and the grip formed directly about the rim of the wheel;

Figure 8 is a view taken along the line 8—8 of Figure 7 with a portion of the stock broken away;

Figure 9 is a sectional view of a second mold into which the wheel and applied rubber are transferred after being removed from the mold shown in Figure 7;

Figure 10 is an enlarged fragmentary view of Figure 9 showing the rubber expanded and filling the mold;

Figure 11 is a top plan view of a steering wheel having a wooden, metal or composition rim to which a grip has been applied in accordance with another embodiment of this invention;

Figure 12 is a sectional view taken along the line 12—12 of Figure 11;

Figure 13 is a fragmentary sectional view illustrating the manner in which the grip shown in Figures 11 and 12 is molded about the metal or composition rim of the steering wheel; and Figure 14 is a transverse sectional view through the grip portion showing a modified form wherein the air-filled or sponge rubber cushioning member is covered by a thin sheet or layer of smooth or mechanical rubber.

According to the improved method of forming a steering wheel grip or the like of sponge rubber, a mold is provided conforming to the configuration of the grip to be manufactured and in the present illustration a mold has been shown of the proper outline to form a grip for the steering wheel of an automobile. This mold has upper and lower sections 1 and 2 formed of duralumin, steel, or other suitable metal. The two mold sections are of solid formation as shown in Figure 1, but have their inner faces recessed, as shown at 3 and 4, to provide a chamber 5 when the two sections are in engagement with each other and the recess 3 of the upper section registering with the recess 4 of the lower section, as shown in Figure 4. The core 6 which may be formed of aluminum, iron, steel, or other suitable material, is formed with or carried by a plate 7, and the plate and core are of such dimensions that when the core is set in place, with the plate resting upon the central portion 8 of the lower mold section, the core will extend centrally of the recess 4 and axially of the chamber 5. It should also be noted that the plate 7 is of such thickness that when the two mold sections are in engagement with each other, the plate will be engaged between the central portions of the two sections and firmly held in its proper place to maintain the core axially of the chamber 5.

Previously it has been found impossible to control expansion of the stock from which sponge rubber is made and cause it to move in the proper direction and form a hollow annular grip of the proper dimensions and configuration. The stock is of a consistency similar to dough from which bread is made, and according to this improved method the stock is cut to form strips of the proper length and width. One of these strips of stock is applied to the core, as shown at 9, and is folded so that it extends about the core in enclosing relation thereto with its margins bearing against upper and lower faces of the core plate 7, as shown in Figure 4. It is necessary to maintain the stock in close contact with the core during expansion and curing of the stock and in order to do so there have been provided pins 10 which project radially from the core under the plate 7 and are diagonally disposed at a converging angle. These pins are embedded in the marginal portion of the stock extending about the under portion of the core and they serve very effectively to hold the stock in close contacting engagement with the core. Instead of pins, rings may be provided in the mold to hold the stock about the core, or the core may be formed of twisted metal. After the stock has been applied to the core and the core set in place upon the lower mold section, the upper mold section is applied to the lower mold section where it is secured in any desired manner. The mold is then subjected to heat and pressure of about three hundred pounds, and as the heat strikes carbon dioxide in the stock it expands and converts the stock into a spongy mass having a large number of small cells therein. The carbon dioxide gas does not escape from the mold but where it strikes walls of the mold sections, it forms a skin with small depressions or pockets in the surface of the expanded stock and when the stock is fully cured, the grip 11 will have a pitted surface which has a soft feel when grasped in a person's hand and will not be liable to slip as the pits serve as vacuum cups and create a suction resisting sliding of the grip through the hands of a person holding a steering wheel to which the improved grip has been applied. As the stock is held about the annular core by the pins 10 it will remain in close contacting engagement with the core and adjacent portions of the core plate and when fully cured will accurately conform to the contour of the core. Therefore, when the mold sections are separated and the core and formed grip removed therefrom, the grip will be of such size and configuration that it will fit snugly about the rim of a steering wheel. As the core plate extends between margins of the stock, a grip will be formed having a circumferential slit about its inner circumference and can be easily expanded and applied to the rim of a steering wheel. The abutting edge faces of the grip may then be cemented to each other and the grip will be securely held in place about the rim of the wheel. By providing ribs upon the walls of the chamber 5, the grip may be formed with ridges similar to those upon the tread of a bicycle tire and may serve to assist in preventing the grip from slipping through a person's hand.

It has also been found that the grip may be directly applied to the rim of a steering wheel and a method of carrying out this embodiment of the invention has been illustrated in Figures 7 through 13. The steering wheel 12, shown in Figures 7 through 10, is formed of metal or hard rubber and when such a wheel is used its hub and spokes take the place of the core plate 7. The rim 13 which serves as a core is of approximately the diameter of the core 7 and will be centered in the chamber 14 of a shaping mold 15. The shaping mold is formed of upper and lower sections which are separable in order that the steering wheel may be secured between them after the stock 16 has been folded about its rim and the inner portion of the lower mold section has recesses 17 formed radially in its upper face to receive spokes of the wheel. Therefore, the mold sections may have face to face contact with each other and the mold be tightly closed. After the mold has been closed it is subjected to sufficient pressure to set the stock about the rim and the mold sections then taken apart and the wheel with the stock adhering thereto removed and transferred to a finishing mold 18 having a chamber 19 of approximately the diameter of the chamber 5 and of appreciably greater diameter than the covered rim, as shown clearly in Figure 9. Sections of the mold 18 are secured when the wheel is in place and the mold then subjected to heat which expands the stock to fill the chamber as shown in Figure 10, and completely enclose the rim. Therefore, the marginal edges of the stock will be united and a closed grip 20 will be formed which entirely surrounds the rim of the wheel and cannot shift circumferentially of the rim as the spokes of the wheel extend through the grip.

When a grip is to be applied to a steering wheel 21 having a hub and spokes of metal, hard rubber or composition rim 22, the surface of the rim should be roughened, as indicated at 23, so that the stock will adhere to it. The stock 24 is applied about the rim, as previously set forth, and the covered rim first supported between sections of a forming mold and then transferred to a finishing mold 25 in which the stock expands to fill the mold chamber and form a grip 26 of the desired size, or the wheel having its rim covered with stock may be initially placed in the mold 25 and the expanding and curing of the stock completed in one operation.

Under the process just described, the spokes of the steering wheel may also be cushioned, as well as the rim, if desired, without departing from the spirit of the invention. A replaceable unit for the rubber portion of such grips may also be made as described. Such replaceable units when made, are preferably made over the same size as the desired rim, only a mould lubricant is used on the metal base so as to facilitate the removal of the finished product. If made under the last described process, the cushion is split on the inner center which permits its removal from the cushion from the metal core.

Should it be desired the sponge rubber stock may be covered with a thin sheet of mechanical rubber 27 as shown in Figure 14 to provide a smooth surface.

Having described the invention, what is claimed as new is:

A method of forming an annular hand grip of soft sponge rubber for a steering wheel rim comprising applying a strip of sponge rubber stock about the rim of a wheel for the entire circumference thereof, applying the wheel to a mold having an annular chamber with the rim centered in the chamber, subjecting the mold to pressure to evenly distribute the stock and completely fill the mold and shape the stock about the rim, transferring the wheel to a second mold having a chamber of greater diameter than the chamber of the first mold and disposing the covered rim in centered relation to the mold chamber, and subjecting the second mold to heat to expand the stock to completely fill its chamber and cure the expanded stock to form a soft sponge rubber grip extending entirely about and enclosing the rim.

MORRIS B. RATNER.